United States Patent [19]

Maeda et al.

[11] 4,180,327

[45] Dec. 25, 1979

[54] SPECTROPHOTOMETERS WITH DIGITAL PROCESSING

[75] Inventors: Yoshio Maeda; Koichi Matsumoto; Seigo Kamitake, all of Katsuta, Japan

[73] Assignee: Hitachi, Ltd., Tokyo, Japan

[21] Appl. No.: 843,790

[22] Filed: Oct. 20, 1977

[30] Foreign Application Priority Data

Oct. 22, 1976 [JP] Japan ................................ 51-126201

[51] Int. Cl.² .............................................. G01J 3/42
[52] U.S. Cl. ..................................... 356/320; 356/325
[58] Field of Search ....................... 356/88, 89, 93, 94, 356/95, 96, 97, 205, 319, 320, 323, 324, 325; 324/140 D

[56] References Cited

U.S. PATENT DOCUMENTS

| | | | |
|---|---|---|---|
| 3,098,408 | 7/1963 | Cary | 356/95 X |
| 3,609,047 | 9/1971 | Marlow | 356/205 |
| 3,646,331 | 2/1972 | Lord | 356/96 X |
| 3,712,738 | 1/1973 | Yamamoto | 356/93 |
| 3,790,279 | 2/1974 | Skala | 356/205 X |
| 4,060,326 | 11/1977 | Tirabassi et al. | 356/96 |

Primary Examiner—Vincent P. McGraw
Attorney, Agent, or Firm—Thomas E. Beall, Jr.

[57] ABSTRACT

Monochromatic light emitted from a monochromator is split into two light beams. These light beams are detected by a photodetector and converted into corresponding electric signals after having been transmitted, respectively, through a sample to be analyzed and a reference placed in the respective beam paths. The signal corresponding to the light beam transmitted through the sample and the signal corresponding to the light beam transmitted through the reference are converted into digital signals which are subsequently stored in respective digital storages or memories. The signal corresponding to the light beam transmitted through the reference is compared with a value in a predetermined range. The resultant value is then converted into an analog signal for operating a sensitivity regulator thereby to adjust the sensitivity of the photodetector. Thus, the signal corresponding to the light beam transmitted through the reference (reference light signal) is so controlled as to lie in a predetermined range. From the digital signals stored in the digital memory, ratio between the sample light signal and the reference light signal is arithmetically calculated by a digital processor unit for determining the transmittance of the sample. Since the reference light signal is prevented from significant variation and the calculation of the signal ratio is effected on the basis of digital technique, the measurement accuracy is remarkably enhanced.

7 Claims, 2 Drawing Figures

SPECTROPHOTOMETERS WITH DIGITAL PROCESSING

BACKGROUND OF THE INVENTION

1. Field of the Invention

The present invention relates to a spectrophotometer.

2. Description of the Prior Art

The spectrophotometer is a device for determining spectrophotometrically optical characteristics of a sample substance to be analized. The optical characteristics may encompass transmittance, reflectivity, absorbance or the like optical properties. Among the spectrophotometers, the double beam type and the two-wavelength type spectrophotometers are familiar in the art. In the double beam type spectrophotometer, the light beam from the monochromator is split into a reference beam which is destined to be transmitted through a reference and a sample beam to be transmitted through a sample to be analyzed. The optical characteristics of the sample is determined by deriving ratio between the reference and the sample beam in term of the quantity of light in combination with the wavelength scanning of the monochromator. In the case of the two-wavelength spectrophotometer, the sample is irradiated with light beams from two monochromators. In carrying out the measurement or analysis, wavelengths of two monochromatic light rays may be fixed at different values, or one of the wavelengths may be fixed at a certain value while the other is scanned, or alternatively two monochromatic light rays may be maintained at a predetermined wavelength difference which in turn is scanned.

Now, difficulties of the hitherto known spectrophotometers will be described by taking an example of the double beam spectrophotometer of direct ratio recording system. Light from a light source is directed to a monochromator for deriving a monochromatic light ray which is then split through a rotating sector mirror into two light beams, i.e. the reference beam and the sample beam on the time-series base. These two types of beams are transmitted through a reference and a sample, respectively, and subsequently synthesized into a single beam by means of another sector mirror rotated in synchronism with the first mentioned sector mirror. The synthesized single beam is applied to a photodetector on the time-series base. An output signal from the photodetector is amplified and then discriminated in respect of phase with the aid of a synchronous signal generated in synchronism with the rotation of the sector mirrors. The signals corresponding to the reference beam and the sample beam (reference beam signal R and sample beam signal S) derived from the phase-discrimination are then alternatively fed to respective hold circuits thereby to be converted into corresponding d.c. signals which are then compared with each other by a ratio meter or the like to be displayed on a display such as a recorder. When the absorbance characteristic of a sample is to be determined, the measured value is often subjected to a logarithmic conversion to produce a linear display absorbance, since the absorbance is frequently discussed on the basis of the Lambert-Beer's law.

In connection with the wavelength scanning in the spectrophotometers, it is noted that the reference beam signal R and the sample beam signal S are varied as a function of the wavelength $\lambda$ in accordance with multiplicated values of energy $E(\lambda)$ of the light source, efficiency $M(\lambda)$ of the optical system and sensitivity $D(\lambda)$ of the photodetector. The rate of such variation in dependence on the wave-length is on the order of several tens to several hundreds of magnitudes in the case of spectrophotometers for ultraviolet and visible ranges. Accordingly, when the ratio (S/R) between the reference beam signal and the sample beam signal is to be determined through an electrical comparator means such as a ratio meter having usually an accuracy capable of displaying the result with three to four digits, the ratio may be determined with a reasonable accuracy in the range of the wavelengths in which the multiplicated values are large. However, in the wavelength range in which the multiplicated values are relatively poor, the attainable accuracy would be degraded to one several tenths to several hundredths as compared with the former case.

In addition to the direct ratio recording system, there has been known an automatic gain control method. In accordance with this method, no ratio meter is employed. Instead thereof, the output signal from the hold circuit corresponding to the reference beam is compared with a predetermined value through a comparator and fed back to control the sensitivity of the photodetector through a sensitivity regulator including DC-DC converters or the like, thereby to maintain the magnitude of the reference beam signal R output from the photodetector. On the other hand, the sample beam S is supplied to a display such as a recorder, whereby the ratio S/R, namely, transmittance of the sample can be obtained. This system is referred to also as the dinode feedback method. Further, method of adjusting the slit of the monochromator (slit servo method) is often employed. These prior art spectrophotometers are described in a Japanese literature, Sibata "Spectrum Measurements and Spectrophotometers" published by Kodansha Scientific, Oct. 10, 1974, pages 125-133. Furthermore, there are methods that control the intensity of the light source, a gain of an amplifier, a comb in the light beam and so on.

The spectrophotometers which are operated through analog techniques as described above are disadvantageous in that the measurement accuracy is relatively low due to drifts in the amplifiers and hold circuits as well as a poor stability of a reference potential. In particular, in the case of the dinode feedback method in which the sensitivity regulator including DC—DC converter or the like tends to respond with some delay, the wavelength scanning can not be effected as desired at a high speed, since the delay in the response of the sensitivity regulator will exert adverse influence to the spectrum as derived. In the slit servo method, change in the slit width will bring about variations in the wavelength. Further, because of regulation of a mechanical nature, delay in the response will be inevitable.

Although the foregoing discussion has been directed to the double beam spectrophotometer, it will be understood that similar problems may arise in the two-wavelength spectrophotometer since the direct ratio recording system as well as the automatic gain control method are adopted also in the latter.

In brief, the hitherto known spectrophotometers suffer from the drawback that the measurement accuracy remains at a relatively low level due to various factors, as will be appreciated from the above description.

SUMMARY OF THE INVENTION

An object of the invention is to provide a spectrophotometer having a high measurement accuracy.

According to the teachings of the invention, two varieties of light signals containing optical characteristics of a sample to be measured are converted into corresponding digital signals, one of which is subsequently controlled so that the magnitude thereof (signal quantity) may lie in a predetermined range. Thereafter, ratio between the two digital signals is arithmetically determined by a digital processor unit. Since the control of the one signal may be effected at a reasonable accuracy and additionally the signal ratio is determined through digital techniques, the measurement accuracy is significantly enhanced.

DESCRIPTION OF THE PREFERRED EMBODIMENTS

Figure 1:
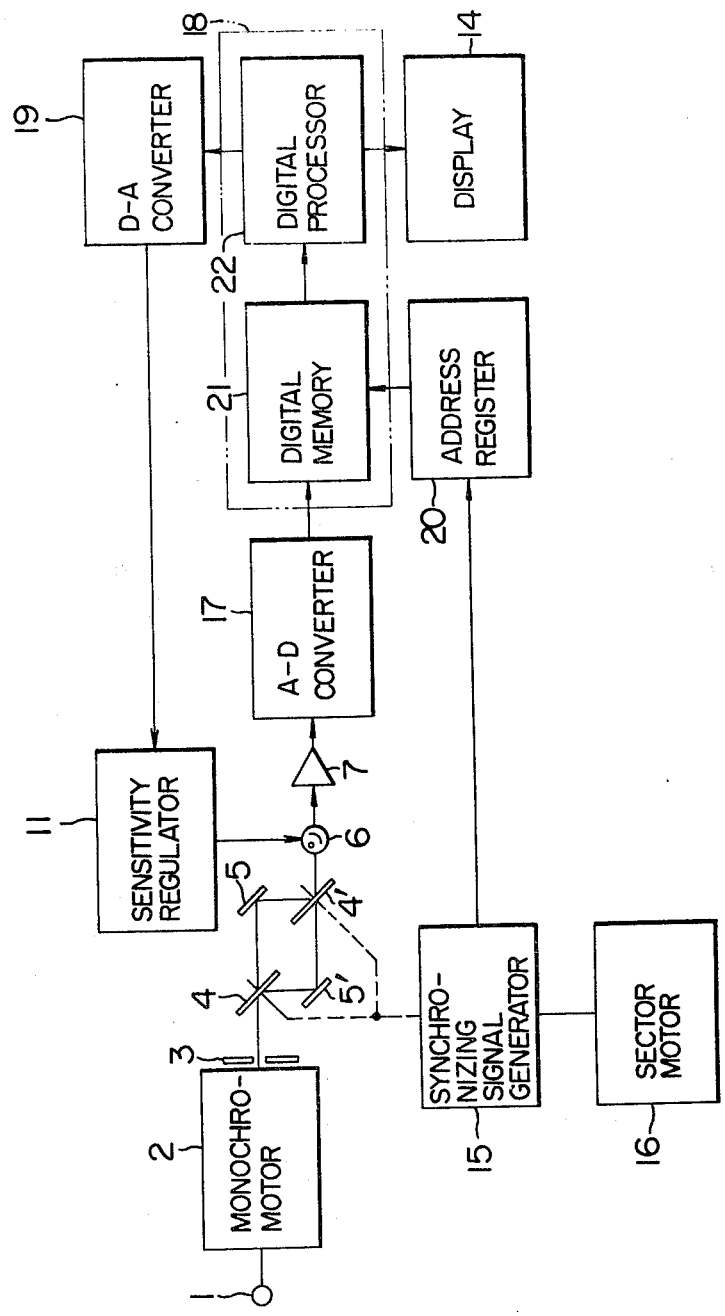
FIG. 1 is a functional diagram of a spectrophotometer in accordance with an embodiment of the invention.

Referring to FIG. 1 which shows in a functional diagram a double beam spectrophotometer according to an embodiment of the invention, reference numeral 1 denotes a light source for emitting continuous spectra which may be usually constituted by an incandescent lamp, hydrogen lamp, deuterium lamp or the like. Of course, a halogen lamp and xenon lamp may be employed, if desired. The light ray from the light source 1 impinges on a monochromator 2 which includes dispersion elements such as a prism and a diffraction grating for dispersing impinging light ray. By rotating the dispersion elements, a monochromatic light ray of a given wavelength can be taken out from the monochromator through an exit slit 3 thereof. A sector mirror 4 has a light transmissive surface region and a reflecting surface region and is adapted to be rotated by a drive motor 16. The light from the exit slit 3 is split into a reference beam R and a sample beam S through the rotating sector mirror 4 on a time-series base. The reference beam R and the sample beam S reach at a sector mirror 4' after having been reflected at reflection mirrors 5 and 5', respectively. A reference and a sample to be examined are placed in the paths of the reference beam R and the sample beam S, respectively, whereby the beams R and S are absorbed by the reference and the sample. The sector mirror 4' has transmissive and reflective surface areas as in the case of the sector mirror 4 and is adapted to be rotated by the motor 16 in synchronism with the mirror 4. Through the rotation of the sector mirror 4', the reference beam R and the sample beam S are synthesized into a single beam which thus consists of alternately arrayed reference and sample beam components on the time-series base. The synthesized beam is converted into an electric signal through a photodetector 6 which may be constituted by a phototube, photomultiplier, photocell, photodiode or the like. The electric signal output from the photodetector 6 is amplified by a preamplifier 7 and subsequently converted into a corresponding digital signal through an analog-to-digital converter 17 (hereinafter referred to simply as A-D converter). Connected to the sector motor 16 is a synchronizing signal generator 15 which is adapted to produce the synchronizing signal utilized for discriminating the phases (or reference and sample beam signal components) and may be of the same construction as a synchronizing signal generator employed heretofore to store the reference beam signal and the sample beam signal in the respective hold circuits. As an exemplary embodiment, the synchronizing signal generator 15 may be composed of a disk directly coupled to a shaft of the motor 16, which disk is formed with two types of holes in the circumferential direction thereof having different radii. One group of the holes is associated with the reflecting surface region of the sector mirror 4, while the other group of holes is associated with the light transmissive surface region of the sector mirror 4. A pair of photo-couplers are disposed at both sides of the disk in alignment with the array of holes. In this manner, when the paired photocouplers are optically interrupted by the rotating disk, no synchronizing signal is produced. On the other hand, when the photocouplers come to alignment with the holes during the rotation of the disk, the synchronizing signal is generated for discriminating the phase of the digital signal described above. The phase discriminating signal thus generated is utilized for controlling contents in an address register 20, whereby the digital signal component corresponding to the reference beam as well as the digital signal component representative of the sample beam are stored in a digital memory 21 at respectively allotted addresses. The digital memory 21 is usually contained in a digital computer 18. In the case of the illustrated embodiment, the magnitude of reference digital signal R is compared with predetermined maximum and minimum values Rmax and Rmin in the digital processor unit 22 with the results thereof being an output as analog quantities through a digital-to-analog or D-A converter 19 to be utilized for adjusting the sensitivity of the photodetector 6 through a sensitivity regulator 11. The adjustment control is made such that $Rmax > R > Rmin$. Hereon, the control is possible to the magnitude of sample digital signal S. The digital processor unit 22 is further adapted to read out the reference beam signal R and the sample beam signal S from the digital memory 21 to arithmetically determine the ratio S/R which is then digitally displayed on a display device 14 in term of transmittance and absorbance of the sample after the logarithmic conversion, if necessary. The result of the arithmetic operation of the digital processor unit 22 may be displayed on an analog display device such as recorder or the like after having undergone the D-A conversion. Incidentally, the sensitivity regulator is disclosed in U.S. Pat. No. 3,098,408.

Description will be made now on the method of comparing the reference beam signal R with the preset maximum (upper limit) and minimum (lower limit) values Rmax and Rmin. According to a first process, the magnitude or value of the reference beam signal R is divided by a constant k which is selected in dependence on the difference between Rmax and Rmin, and determination is made as to whether the quotient R/k is equal to a constant C or not. As an example, when Rmax and Rmin are equal to "99" and "90", respectively, as decimally notated, then the constant k can be selected equal to "10". Then, the quotient (R/k) remains to be equal to "9" so far as R is in the range of "90" to "99". Thus, by selecting "9" for the constant C, it is possible to determine if the value R lies in the range of "99" to "90". This comparison can be easily accomplished without comparing the value R individually with Rmax and Rmin. According to a second method, only the significant digit of the value R is used for comparison with a constant C'. For example, when Rmax=99 and Rmin=90, the most significant digit of R in the range of "99" to "90" is "9". Thus, by selecting "9" for the constant C', the determination of R as to the range thereof can be more easily realized than the first method described above.

Although the above description is made by using decimal numbers, it will be appreciated that the digital operation is generally performed by using binary numbers. Further, it is of course possible to compare R with Rmax and Rmin, individually, although the process therefor will become more complicated than the above described comparison method.

A control quantity $V_n$ for adjusting the sensitivity of the photodetector 18 through the D-A converter 19 can be obtained by adding the result of above described arithmetic operation, i.e. (C−R/k) to the control quantity $V_{n-1}$ which has been used for adjusting the detector sensitivity on the basis of the results of the preceding arithmetic operation. In this manner, reference beam signal value R can be controlled so that it will constantly fall within the range defined by Rmax>R>Rmin.

In the above description, it has been assumed that the dinode feedback method is adopted. However, the invention can be equally applied to the slit servo method, in which case the signal from the digital processor unit is fed to a servo motor for adjusting the width of the slit.

The spectrophotometer described above provides following advantages. The transmittance and reflectivity of the sample can be displayed on the device 14 for every period of rotation of the sector mirror with a high speed response without being influenced by delay in the feedback system for the adjustment of sensitivity of the photodetector 18, since the display is made on the basis of the arithmetic determination.

Since the ratio S/R is determined through digital operation, it is possible to enhance the measurement accuracy by increasing the word length of the digital quantities S and R. As such control that the reference beam signal quantity R lies in a predetermined range does not have an influence on the measurement accuracy, the length of word (number of bits) processed by the D-A converter upon adjusting the sensitivity of the photodetector in accordance with the control signal from the digital processor unit can be maintained relatively small. In general, a D-A converter is degraded in respect of noise characteristic and tends to delay in response, as the number of bits to be processed is increased. Such disadvantage is also eliminated in the spectrophotometer according to the invention. The reference beam signal quantity R is merely so controlled as to fall within a predetermined range rather than maintained at a predetermined constant value. Thus, the D-A converter and the sensitivity regulator may be inexpensively implemented at slight expense of the operation accuracy thereof. Nevertheless, the optical properties of the sample such as transmittance and reflectivity can be measured with an enhanced accuracy because the ratio S/R is determined through digital arithmetic operation.

Furthermore, any possible delay in the feedback system for the sensitivity regulator will not directly influence the spectra as obtained. This feature allows the wavelength scanning of the spectrophotometer to be effected at a speed independently from the response speed.

In the foregoing, description has been made on the exemplary embodiments of the double beam spectrophotometer and in particular to the type in which the monochromatic light ray from a monochromator is splitted into two beams. However, there has been hitherto known such type of double beam spectrophotometer in which the light from a light source is initially splitted into two beams which are again synthesized into a single beam after having transmitted through a reference and a sample to be examined. The synthesized beam is then fed to a monochromator. The invention can be applied also to this type of spectrophotometer.

Figure 2:
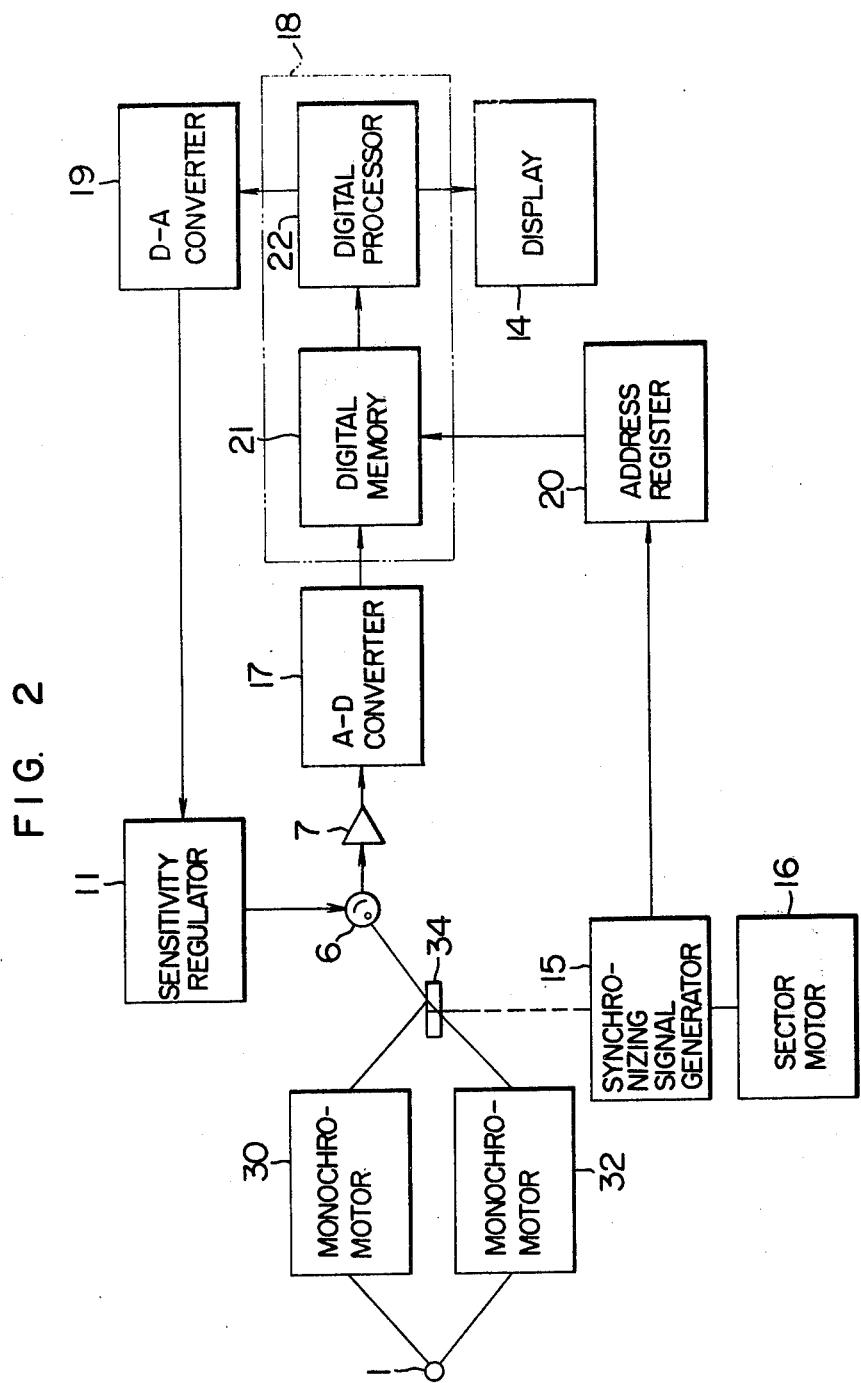
FIG. 2 is a functional diagram of a two-wavelength spectrophotometer to which the teachings of the invention are applied.

Referring to FIG. 2 which is a functional diagram of a two-wavelength spectrophotometer according to an embodiment of the invention, light emitted from a light source 1 is directed to two monochromators 30 and 32 from which monochromatic light rays are derived, respectively, and synthesized into a single beam. The light transmitted through the sample is detected by a photodetector 6, the output signal from which undergoes A-D conversion. As is in the case of the embodiment shown in FIG. 1, the digital signals corresponding to the monochromatic light rays from the respective monochromators 30 and 32 are stored in the digital memory 21 at the respectively allotted addresses under the command of the address register 20 which is operated by the signal from the synchronizing signal generator 15. Ratio between the digital signals is arithmetically determined by the digital processor unit 22 and displayed on the display device 14. It will be appreciated that the two-wavelength spectrophotometer to which the invention is applied assures the examination of a sample with an enhanced accuracy.

We claim:
1. A spectrophotometer comprising:
a light source for emitting continuous spectra,
a photodetector for converting light impinging thereon into an electric signal, said photodetector being adapted to detect light from a sample disposed between said light source and said photodetector,
means disposed between said photodetector and said light source for producing two types of lights,
first monochromator means disposed between said light source and said photodetector for deriving monochromatic light ray,
an analog-to-digital converter for converting electric signal from said photodetector into a digital signal,
a digital memory for storing separately digital signals from said analog-to-digital converter corresponding, respectively, to said two types of light,
means for controlling so that signal value of one of said digital signals stored in said digital memory lies in a fixed range, and
a digital processor unit for reading out said two digital signals from said digital memory and arithmetically determining ratio between said digital signals.
2. A spectrophotometer as set forth in claim 1, wherein said means for producing two types of lights is constituted by splitter means for splitting light beam into a reference beam and a sample beam for performing spectrophotometry with double beams.
3. A spectrophotometer as set forth in claim 1, wherein said means for producing two types of lights is constituted by a second monochromator juxtaposed to said first monochromator between said light source and said photodetector for performing photometry by making use of two wavelengths.

4. A spectrophotometer as set forth in claim 1, wherein said controlling means includes means for determining whether the signal value of one of said digital signals lies in said fixed range, and means for controlling so that signal values of one of said digital signals are in dependence on the signal output from said determining means.

5. A spectrophotometer as set forth in claim 4, wherein said determining means includes means for dividing the signal value of one of said digital signal by a value selected on the basis of difference between an upper limit value and a lower limit value defining said fixed range, and means for comparing resultant quotient with a constant value.

6. A spectrophotometer as set forth in claim 4, wherein said determining means includes means for comparing a significant digit of the signal value of one of said digital signals with a constant value.

7. A spectrophotometer, comprising:
a single light source; means for producing two separate light beams from said single light source, and for passing one of said beams through a sample and the other of said beams through a reference; a photodetector mounted so as to receive the light from each of said beams after it has passed respectively through the sample and reference, and for producing an electrical output signal composed of a sample electrical signal and a reference electrical signal; an analog-to-digital converter receiving the reference electrical signal and the sample electrical signal and respectively converting them into reference and sample digital electrical signals;

digital processor means for receiving said digital sample and reference electrical signals and producing a digital output ratio signal correlated to the ratio of said digital sample signal to said digital reference signal; means for controlling at least one of said light source, photodetector and means for producing so as to selectively vary the amplitude of said reference electrical signal and said sample electrical signal; and means for receiving one of said sample digital signal and reference digital signal and producing an analog control signal only when said one digital signal moves outside of a fixed digital range, and feeding said analog signal to said means to control so as to adjust said one digital signal back within said fixed digital signal range.

* * * * *